United States Patent
Takahara et al.

(10) Patent No.: US 9,070,511 B2
(45) Date of Patent: Jun. 30, 2015

(54) SEALING MEMBER FOR A CAPACITOR AND METHOD FOR MANUFACTURING A CAPACITOR

(71) Applicant: Panasonic Intellectual Property Management Co., Ltd., Osaka (JP)

(72) Inventors: Norihisa Takahara, Osaka (JP); Yukihiro Shimasaki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 195 days.

(21) Appl. No.: 13/678,669

(22) Filed: Nov. 16, 2012

(65) Prior Publication Data

US 2013/0128414 A1 May 23, 2013

(30) Foreign Application Priority Data

Nov. 17, 2011 (JP) ................... 2011-251328

(51) Int. Cl.
  *H01G 9/10* (2006.01)
  *H01G 9/004* (2006.01)
  *H01G 9/145* (2006.01)
  H01G 9/00 (2006.01)
  H01G 9/008 (2006.01)

(52) U.S. Cl.
  CPC ............... *H01G 9/004* (2013.01); *H01G 9/145* (2013.01); *H01G 9/0029* (2013.01); *Y10T 29/417* (2015.01); *H01G 9/008* (2013.01); *H01G 9/10* (2013.01)

(58) Field of Classification Search
  CPC ........... H01G 9/008; H01G 9/10; H01G 9/08; H01G 9/06; H01G 11/78; H01G 11/80; H01G 11/82; H01G 13/006; H01G 2/10; H01G 2/103; H01G 4/224; H01G 4/228; H01G 4/28; H01G 4/32
  See application file for complete search history.

(56) References Cited

U.S. PATENT DOCUMENTS 6,366,447 B1 * 4/2002 Nakaaki ................... 361/518
8,432,664 B2 * 4/2013 Hirota et al. ............... 361/518

FOREIGN PATENT DOCUMENTS

| JP | 60-36094 | 8/1985 |
| JP | 60-224212 | 11/1985 |

* cited by examiner

*Primary Examiner* — Dion R Ferguson
(74) *Attorney, Agent, or Firm* — Wenderoth, Lind & Ponack, L.L.P.

(57) ABSTRACT

A sealing member for a capacitor is formed of an elastic material, and has a circular cylindrical shape extending along an axial direction. The sectional view perpendicular to the axial direction shows a circular shape. Further, a pair of through-holes is formed parallel to the axial direction. The shape of each through-hole in the sectional view perpendicular to the axial direction of the sealing member is composed of a first arc and a second arc. The first arc protrudes toward the circumference of the sealing member. The second arc protrudes toward the center of the sealing member and has a curvature smaller than that of the first arc.

1 Claim, 4 Drawing Sheets

SEALING MEMBER FOR A CAPACITOR AND METHOD FOR MANUFACTURING A CAPACITOR

BACKGROUND

1. Technical Field

The technical field relates to a sealing member for use in a capacitor including an electrolytic solution, and to a method for manufacturing a capacitor including the sealing member.

2. Background Art

FIG. 4 is a partially cutaway view in perspective of an aluminum electrolytic capacitor, as an example of conventional capacitor 1. Capacitor 1 includes capacitor element 5, an electrolytic solution (not shown), cylindrical case 6 having a bottom, and sealing member 7. Capacitor element 5 is made by winding a pair of positive electrode foil 2 and negative electrode foil 3 with separator 4 interposed therebetween. Electrode foils 2 and 3 are coupled with lead terminals 8 and 9, respectively. Case 6 houses capacitor element 5 and the electrolytic solution. Sealing member 7 seals the opening of case 6.

Sealing member 7 is provided with two through-holes 10 (hereinafter, holes), and lead terminals 8 and 9 are inserted into respective holes 10. The horizontal section of each of lead terminals 8 and 9 and holes 10 generally has a circular shape. In proximity to the opening of case 6, drawn part 6A is formed and open end 6B is curled. By such processing, sealing member 7 is compressed and seals the opening of case 6. As sealing member 7, a highly sealable rubber material is used so as to suppress leakage of the electrolytic solution.

SUMMARY

A sealing member for a capacitor is formed of an elastic material, and has a circular cylindrical shape extending along the axial direction. The section perpendicular to the axial direction has a circular shape. Further, a pair of through-holes is formed parallel to the axial direction. The shape of each through-hole in the section perpendicular to the axial direction of the sealing member is composed of a first arc and a second arc. The first arc protrudes toward the circumference of the sealing member. The second arc protrudes toward the center of the sealing member and has a curvature smaller than that of the first arc.

DETAILED DESCRIPTION OF PREFERRED EMBODIMENTS

Figure 4:
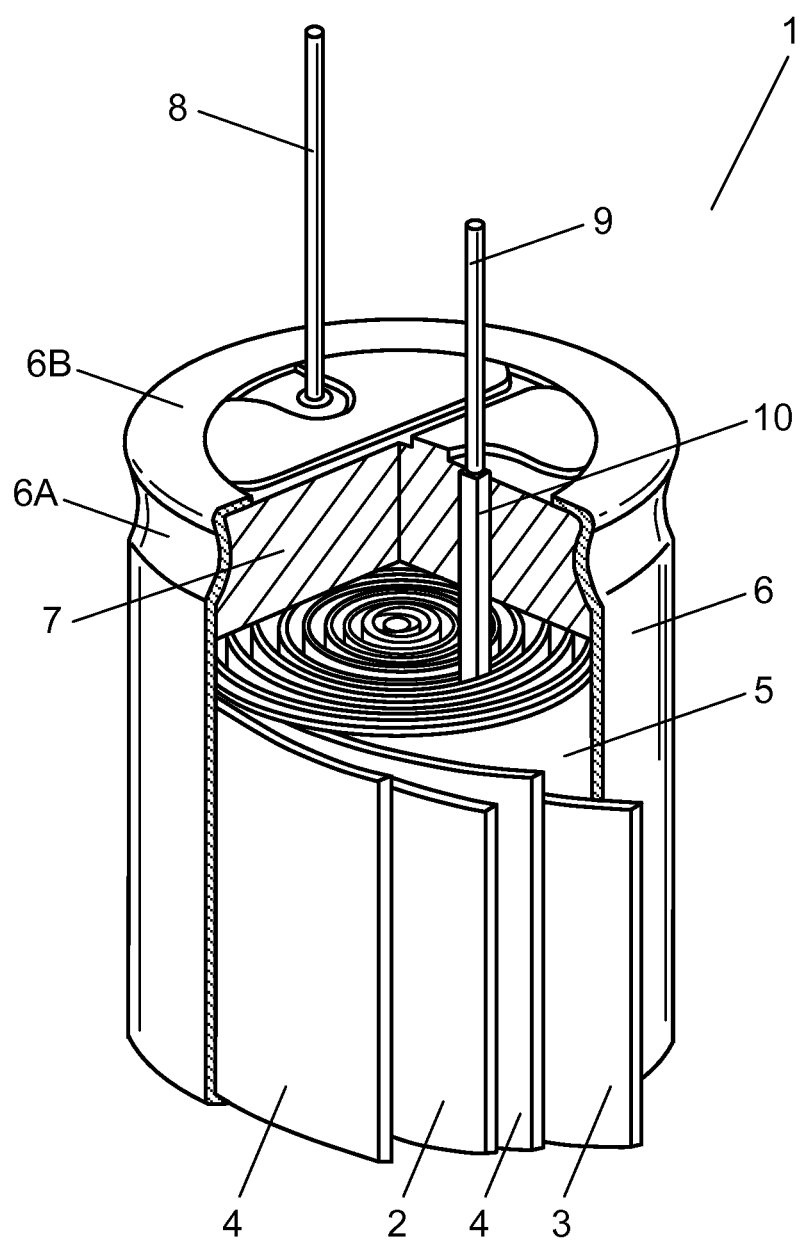
FIG. 4 is a partially cutaway view in perspective of a conventional capacitor.

Prior to the description of an exemplary embodiment, the problems in conventional capacitor 1 shown in FIG. 4 are described.

In capacitor 1, the leakage occurs from the interfaces between lead terminals 8 and 9 and holes 10 in sealing member 7 in many cases. Thus, studies are made on a configuration for enhancing the adhesiveness between lead terminals 8 and 9 and holes 10 and providing longer-term reliability.

In recent years, various electronic devices have been made with higher reliability in quality, and positional changes of the electronic components used in the electronic devices have necessitated downsizing. Thus, also the capacitor is demanded to have a longer life and a higher heat resistance. However, when capacitor 1 is used for an extended period of time or in a high-temperature environment, the adhesiveness between lead terminal 8 or 9 and hole 10 in sealing member 7 becomes insufficient. This can cause leakage of the electrolytic solution from the interfaces between lead terminal 8 or 9 and hole 10 in sealing member 7.

One of the causes of such leakage is as follows. The degradation of a rubber material forming sealing member 7 proceeds and this reduces the stress caused in sealing member 7 by drawn part 6A in proximity to the opening of case 6. For instance, when capacitor 1 is used in an electronic device installed in the engine room of a vehicle, the capacitor is exposed to a high-temperature environment at temperatures close to 135° C. to 150° C., over the service life of the vehicle. Further, the stress loads exerted to lead terminals 8 and 9 vary depending on the positions where the lead terminals make contact with the inside walls of holes 10. In the positions unlikely to have the stress load at the initial stage, the leakage is likely to occur.

Figure 3:
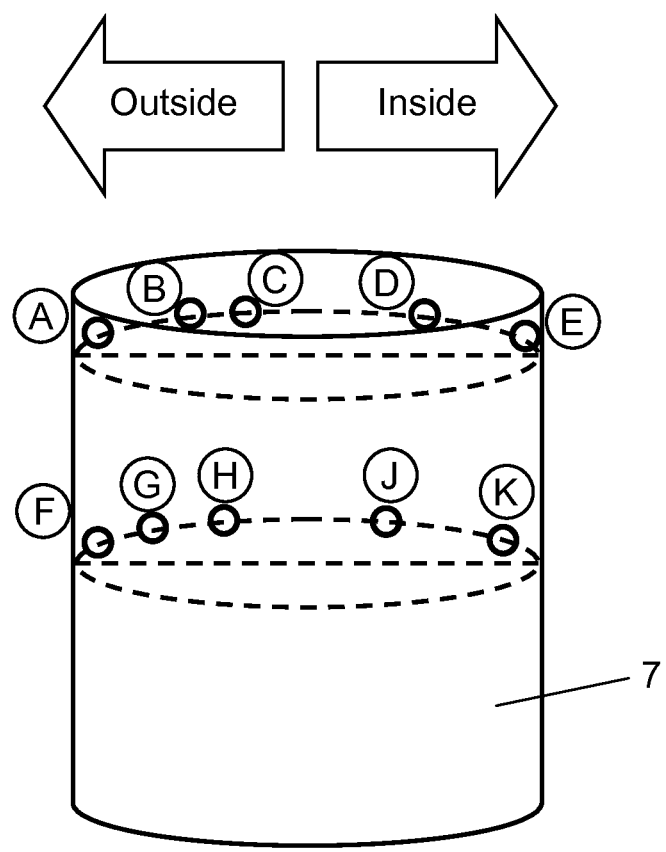
FIG. 3 is a diagram showing positions where stresses in contact surfaces between the lead terminals and the conventional sealing member are calculated.

Table 1 shows a simulation result of the relation between the stress loads and the contact positions between lead terminals 8 and 9 and sealing member 7 when drawn part 6A is formed in case 6 of capacitor 1. The parameters at the simulation include the elastic modulus and Poisson's ratio of sealing member 7, the Yong's modulus and Poisson's ratio of each of lead terminals 8 and 9, and the actual change in the shape of case 6 before and after drawing. The shape of each hole 10 in sealing member 7 is assumed to be a complete circular cylinder. FIG. 3 shows calculation positions where the stresses in the contact surfaces between lead terminals 8 and 9 and sealing member 7 are calculated.

TABLE 1

| | Position | | | | | | | | | |
|---|---|---|---|---|---|---|---|---|---|---|
| | A | B | C | D | E | F | G | H | J | K |
| Stress load (MPa) | 20.4 | 16.5 | 15.0 | 10.2 | 8.8 | 24.3 | 20.1 | 16.1 | 9.3 | 4.3 |

As shown in Table 1, the stress load varies largely depending on the contact surfaces between lead terminals 8 and 9 and sealing member 7, i.e. the positions where lead terminals 8 and 9 make contact with the inside walls of holes 10. The table shows that the stress load is largest in calculation positions A and F nearest to the outer side of sealing member 7 and is smallest in calculation positions E and K nearest to the inner side (the side of the center) of sealing member 7.

That is, when drawing, sealing member 7 undergoes a large stress from the outer side and deforms, and thus lead terminals 8 and 9 undergo a large contact surface pressure in holes 10 from the outer side. In contrast, on the inner side, deformation of sealing member 7 is small and thus the stress load is small. Thus, the stress loads vary depending on the positions where the lead terminals make contact with the inside walls of holes 10 (on the outer side or the inner side), and the adhesiveness between lead terminal 8 or 9 and hole 10 becomes unstable.

Figure 1:
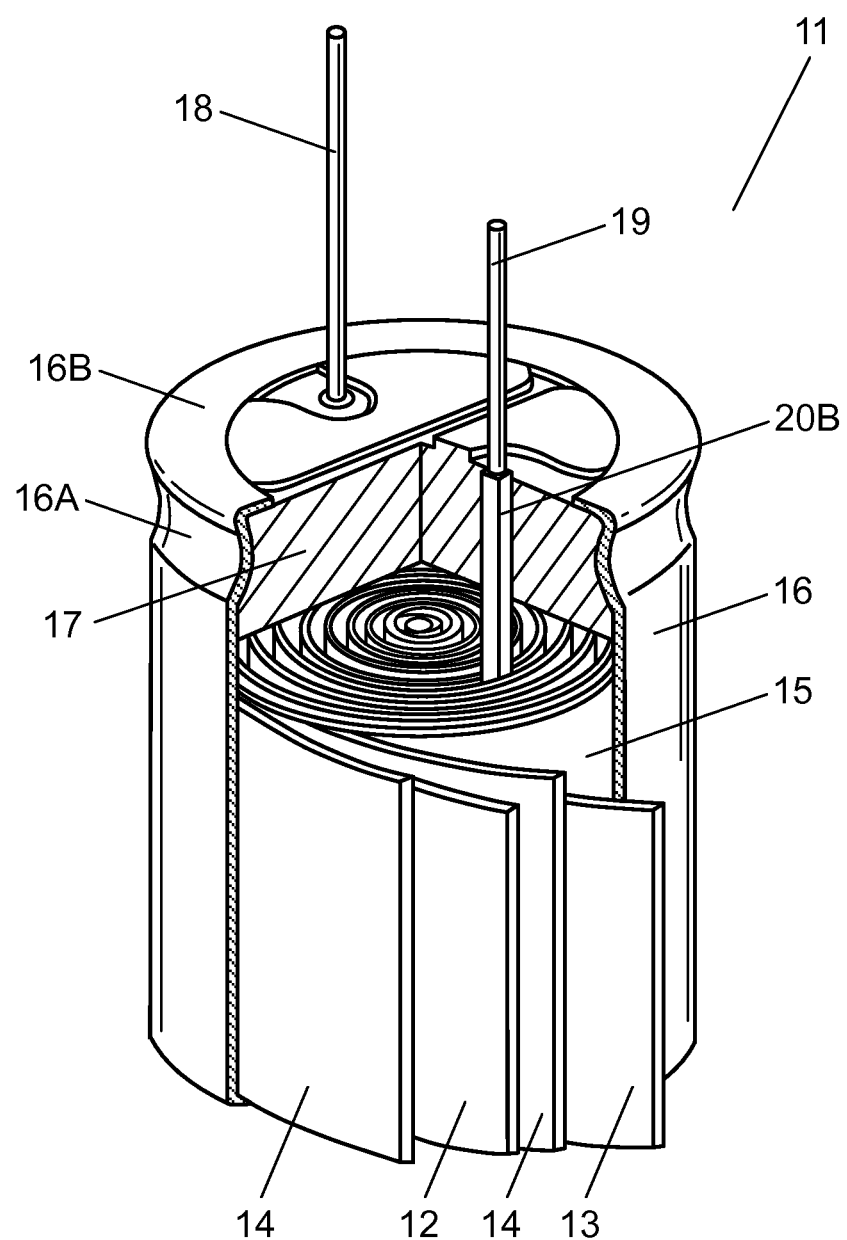
FIG. 1 is a partially cutaway view in perspective of a capacitor in accordance with an exemplary embodiment.

Hereinafter, a description is provided for a sealing member and a method for manufacturing a capacitor in accordance with the exemplary embodiment with reference to the accompanying drawings. FIG. 1 is a partially cutaway view in perspective of an electrolytic capacitor (hereinafter, a capacitor) 11, as an example of a capacitor of this exemplary embodiment. Capacitor 11 includes capacitor element 15, an electrolytic solution (not shown), case 16, and sealing member 17.

Capacitor element 15 includes electrode foil 12, i.e. a positive electrode, and electrode foil 13, i.e. a negative electrode, separator 14, and a pair of lead terminals 18 and 19. Electrode foil 13 faces electrode foil 12 via separator 14 interposed therebetween. Lead terminals 18 and 19 are connected to electrode foils 12 and 13, respectively. Lead terminals 18 and 19 extend parallel to each other with a predetermined distance provided between them. Capacitor element 15 is impregnated with an electrolytic solution. In the configuration shown in FIG. 1, electrode foils 12 and 13 are wound with separator 14 interposed therebetween. However, the present embodiment is not limited to this configuration. Circular cylindrical case 16 has an opening and a bottom. Case 16 houses capacitor element 15 and the electrolytic solution. Sealing member 17 seals the opening of case 16. Lead terminals 18 and 19 penetrate through sealing member 17 and are lead to the outside.

Next, each element is detailed. For electrode foils 12 and 13, an aluminum foil whose effective surface area is enlarged by etching, for example, is used. On the surface of electrode foil 12, a dielectric oxide film is further formed by chemical conversion. As separator 14, a non-woven fabric containing cellulose, kraft, polyethylene terephthalate, polybutylene terephthalate, polyphenylene sulfide, nylon, aromatic polyamide, polyimide, polyamide-imide, polyether imide, rayon, hyaline, or the like can be used. Lead terminals 18 and 19 are made of aluminum wires in consideration of connectivity with corresponding electrode foils 12 and 13.

Examples of the solvent of the electrolytic solution include water, ethylene glycol, γ-butyrolactone, and sulfolane. Examples of the electrolyte include boric acid, adipic acid, and phthalic acid.

Case 16 can be formed of metals, such as aluminum and stainless steel. Sealing member 17 is formed of rubber materials, such as butyl rubber, silicone rubber, fluoro rubber, ethylene propylene rubber, and nitrile rubber. The sealing member has a circular cylindrical shape. That is, sealing member 17 is formed of an elastic material and the sectional view thereof perpendicular to the axial direction shows a circular shape. For example, the diameter of case 16 is 6.3 mm and the height thereof is 7.3 mm. The thickness of sealing member 17 is approximately 1.5 mm.

Figure 2A:
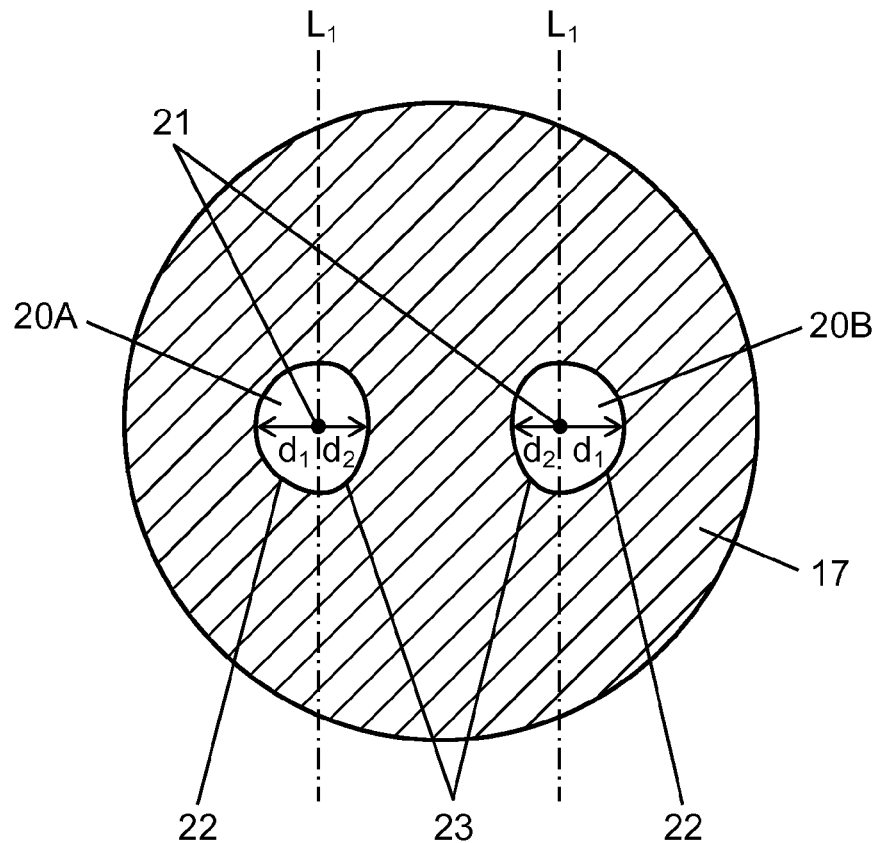
FIG. 2A is a sectional view of a sealing member perpendicular to an axial direction of the sealing member in the capacitor shown in FIG. 1.
Figure 2B:
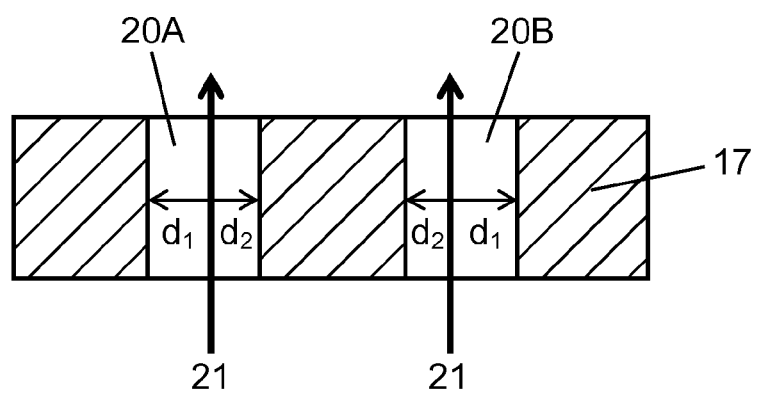
FIG. 2B is a sectional view of the sealing member shown in FIG. 2A, parallel to the axial direction.

Next, sealing member 17 is further detailed. FIG. 2A is a sectional view of sealing member 17 perpendicular to the axial direction of sealing member 17 in capacitor 11. FIG. 2B is a sectional view of sealing member 17 parallel to the axial direction. FIG. 2A and FIG. 2B each shows the state before the compression of sealing member 17.

Through-holes (hereinafter, holes) 20A and 20B for insertion of lead terminals 18 and 19, respectively, are pre-formed in sealing member 17. Holes 20A and 20B is made through sealing member 17 parallel to the axial direction of sealing member 17.

Sealing member 17 can be produced in the following manner, for example. First, pins identical in shape to holes 20A and 20B are set up in an uncrosslinked rubber sheet. Alternatively, a die having pins set up therein is filled with an uncrosslinked rubber material, and thereafter the rubber material is press-formed. Next, the rubber sheet or the rubber material in the die is crosslinked by heating, and the crosslinked rubber is formed into desired shapes by stamping. The pins form holes 20A and 20B. Each of the portions of lead terminals 18 and 19 to be inserted into holes 20A and 20B has a circular cylindrical shape. The central axis of the circular cylindrical shape is the center of the axis in insertion (insertion axis 21).

With reference to FIG. 2A and FIG. 2B, the length from insertion axis 21 of each of lead terminals 18 and 19 to the inside wall of corresponding hole 20A or 20B in the outward direction is defined as $d_1$. The length from insertion axis 21 of each of lead terminals 18 and 19 to the inside wall of corresponding hole 20A or 20B in the inward direction is defined as $d_2$. In each of holes 20A and 20B in the sectional view perpendicular to the axial direction of sealing member 17, $d_2$ is shorter than $d_1$.

Specifically, the inside wall of each of holes 20A and 20B is shaped into a semi-circle on the side nearer to the outer side of sealing member 17 with respect to line $L_1$ going through insertion axis 21 and perpendicular to the direction where holes 20A and 20B are juxtaposed with each other. In contrast, the inside wall nearer to the inner side (the center of the cross-sectional plane of sealing member 17) is formed of an arc shorter than the arc of the semi-circle. That is, the sectional shape of each of holes 20A and 20B perpendicular to the axial direction of sealing member 17 is made by smoothly connecting first arc 22 and second arc 23 having a curvature smaller than that of first arc 22. First arc 22 protrudes toward the circumference of the circular shape of the section of sealing member 17. The second arc protrudes toward the center of the circular shape.

The sectional view of each of lead terminals 18 and 19 perpendicular to insertion axis 21 shows a circular shape. The diameter of the circular shape is slightly larger than that of the semi-circle on the outer side (first arc 22) of corresponding holes 20A and 20B.

Next, a brief description is provided for a method for manufacturing capacitor 11. First, capacitor element 15 is prepared. As described above, capacitor element 15 includes electrode foils 12 and 13, separator 14, and lead terminals 18 and 19. Electrode foil 13 as the negative electrode faces electrode foil 12 as the positive electrode. Separator 14 is interposed between electrode foils 12 and 13. Lead terminals 18 and 19 are connected to electrode foils 12 and 13, respectively.

In order to produce capacitor element 15, first, electrode foils 12 and 13 are connected to lead terminals 18 and 19, respectively. Separator 14 is inserted between electrode foils 12 and 13 in this state. These elements are wound around a winding shaft, the outer circumference is fixed with a tape or the like, and the winding shaft is removed. Thus, capacitor element 15 of the wound type can be produced.

Next, capacitor element 15 is impregnated with an electrolytic solution. Capacitor element 15 and the electrolytic solution are housed in case 16. At this time, capacitor element 15 is immersed in a large amount of electrolytic solution, raised, and inserted into case 16. Alternatively, capacitor 15 may be inserted into case 16 filled with the electrolytic solution in advance. Inversely, after the insertion of capacitor element 15 into case 16, the electrolytic solution may be poured into case 16.

Lead terminals 18 and 19 are inserted into holes 20A and 20B in sealing member 17, and sealing member 17 is disposed in the opening of case 16. Thereafter, the outer circumference in proximity to the opening of case 16 is drawn toward the inner side so as to form drawn part 16A that protrudes toward the inner side. Thus, sealing member 17 is compressed in the radial direction so as to seal the opening of case 16. Open end 16B of case 16 is curled. By this curling, capacitor element 15 can be sealed into case 16 securely.

As described above, in capacitor 11 including sealing member 17, variations in the stress load depending on the positions where lead terminals 18 and 19 make contact with the inside walls of holes 20A and 20B, respectively, formed in sealing member 17 can be reduced. This can enhance the adhesiveness between lead terminals 18 and 19 and the inside walls of holes 20A and 20B in a stable manner. If capacitor 11 is exposed to a severe environment at high temperatures, for example, for an extended period of time, degradation of the material of sealing member 17 proceeds and this reduces the stress caused in sealing member 17 by drawn part 16A of case 16. Even in such a case, sealing member 17 does not have a portion where the stress load is locally weak. Thus, the leakage of the electrolytic solution can be suppressed.

In contrast, capacitor 1 including conventional sealing member 7 shown in FIG. 4 has variations in the stress load depending on the positions where lead terminals 8 and 9 make contact with the inside walls of holes 10 in sealing member 7. Thus, in order to give a sufficient stress load to the portion having a smaller stress load, deeper drawing is necessary. This can result in brakes in drawn part 6A of case 6 or cracks in sealing member 7. When the diameter of each hole 10 is reduced so as to give a sufficient stress load to the portion having a smaller stress load, inserting lead terminals 8 and 9 into holes 10 can be hard or cracks can occur in sealing member 7.

Hereinafter, a specific example is described.

Exemplary Example

As an exemplary example of the capacitor in this exemplary embodiment, the following electrolytic capacitor is produced. In the electrolytic capacitor (6.3 mm in diameter and 5.8 mm in height), the rated voltage is 35 V, and the initial capacitance is 33 µF. (with a tolerance of ±20%).

First, as shown in FIG. 1, electrode foil 12, electrode foil 13, and separator 14, each having a predetermined width and length, are prepared. One ends of lead terminals 18 and 19 are connected to electrode foils 12 and 13, respectively, by needle caulking, for example. Thereafter, electrode foils 12 and 13 with separator 14 interposed between them are wound in a roll shape, and the outer circumferential surface is fixed with an insulating tape so as not to be wound off. Thus, capacitor element 15 in a substantially circular cylindrical shape is formed.

As electrode foil 12, an aluminum foil having a purity of 99.99% or higher is used. An etching treatment is given to this aluminum foil so as to enlarge the surface area thereof, and an anodizing treatment is further given so as to form an aluminum oxide layer (anodic oxide film) as a dielectric substance. The aluminum foil thus treated is cut into a rectangular shape and adjusted so as to have a predetermined project area. Thus, electrode foil 12 is prepared.

As electrode foil 13, an aluminum foil having a purity of 99.99% or higher is used. An etching treatment is given to this aluminum foil so as to enlarge the surface area thereof, and chemical conversion is further performed (at a formation voltage of 2 V) so as to form an aluminum oxide layer on the surface of the aluminum foil. The aluminum foil thus treated is cut into a rectangular shape and adjusted so as to have a predetermined project area facing electrode foil 12. Thus, electrode foil 13 is prepared.

As separator 14, cellulose paper having thickness of 40 µm is used. This cellulose paper is cut so as to have a predetermined area that can prevent contact between electrode foil 12 and electrode foil 13. Thus, separator 14 is prepared.

Next, lead terminals 18 and 19 led out from capacitor element 15 are inserted into holes 20A and 20B that are formed in sealing member 17 made of a rubber material. Then, sealing member 17 is attached to capacitor element 15.

Each of lead terminals 18 and 19 has a configuration in which an extraction electrode is formed of a metal containing aluminum and a tinned metal wire is welded to a first end of this extraction electrode. As the extraction electrode, an aluminum wire in a round bar shape having a diameter of 0.8 mm is used. A second end of this extraction electrode is flattened. The part of the aluminum wire in the round bar shape is disposed in each of holes 20A and 20B. The respective flattened parts are connected to electrode foils 12 and 13.

Sealing member 17 is formed of a rubber material predominantly composed of butyl rubber. The shapes of holes 20A and 20B in the sectional view perpendicular to the axial direction of sealing member 17 are as shown in FIG. 2A. That is, length $d_1$ from insertion axis 21 of each of lead terminals 18 and 19, i.e. the central axis of each of lead terminals 18 and 19, to the inside wall of corresponding hole 20A or 20B toward the outer side is 0.35 mm. Length $d_2$ from insertion axis 21 to the inside wall of corresponding hole 20A or 20B toward the inner side is 0.25 mm. The inside wall of each of holes 20A and 20B is formed of a semi-circle on the side nearer to the outer side of sealing member 17, and an arc on the side nearer to the inner side (center), with respect to line $L_1$ going through insertion axis 21 and perpendicular to the direction where holes 20A and 20B are juxtaposed with each other. The arc on the side nearer to the inner side is shorter than the arc of the semi-circle. The sectional view of each of lead terminals 18 and 19 perpendicular to the axial direction shows a circular shape. The semi-circle on the outer side with respect to insertion axis 21 as a center has a shape similar to that of the semi-circle on the outer side of each of holes 20A and 20B, but the semi-circle of each lead terminal is slightly larger than the semi-circle of each hole.

Meanwhile, an electrolytic solution is prepared and poured into case 16 in advance. This electrolytic solution contains ethyldimethylamine phthalate as the solute, and γ-butyrolactone and sulfolane as the solvent.

Then, capacitor element 15 is inserted into case 16 and impregnated with the electrolytic solution. Further, sealing member 17 attached to capacitor element 15 is disposed in the opening of case 16.

Next, case 16 is compressed from the outer circumferential surface in the vicinity of the opening of case 16 so as to form drawn part 16A and generate a compression stress in sealing member 17. Thereby, the opening of case 16 is sealed.

Thereafter, a predetermined voltage is applied between lead terminals 18 and 19 led to the outside such that chemical conversion is performed again. Thus, the electrolytic capacitor of the exemplary example is produced.

Comparative Example

In the electrolytic capacitor of the comparative example, the sealing member is different from that of the exemplary example. That is, in sealing member 7 for use in the comparative example, the shape of each hole 10 in the sectional view perpendicular to the axial direction of sealing member 7 is a perfect circular shape as shown in FIG. 4. The length from the insertion axis of each of lead terminals 8 and 9, i.e. the central axis of each of lead terminals 8 and 9, to the inside wall of corresponding hole 10 toward the outer side is 0.35 mm. The length from the insertion axis of each of lead terminals 8 and 9 to the inside wall of corresponding hole 10 toward the inner side is also 0.35 mm. With the other conditions same as those in the exemplary example, an electrolytic capacitor is produced so as to have a rated voltage of 35 V and an initial capacitance of 33 μF.

Next, a description is provided for the result of a high-temperature load test (an accelerated test) conducted on 30 electrolytic capacitors of the exemplary example and 30 electrolytic capacitors of the comparative example produced as above. In the high-temperature load test, each electrolytic capacitor is left at 145° C. for 1000 hours while being applied with the rated voltage at 145° C. for 1000 hours. Before and after the test, the electrolytic capacitors are visually checked for leakage from the interfaces between the lead terminals and the holes in the sealing members. The number of capacitors with the leakage is shown in Table 2.

TABLE 2

|  | Before high-temperature load test | After high-temperature load test |
|---|---|---|
| Exemplary Example | 0 | 0 |
| Comparative example | 0 | 20 |

As shown in Table 2, in all of 30 electrolytic capacitors of the exemplary example, no leakage has occurred after the high-temperature load test. In contrast, in 20 out of 30 conventional electrolytic capacitors of the comparative example, leakage has occurred from the interfaces between lead terminal 8 or lead terminal 9 and hole 10 in sealing member 7.

This test shows the following results. In the electrolytic capacitors both of the exemplary example and the comparative example, the leakage from the interfaces between the lead terminals and the holes in the sealing members can be suppressed at the initial stage. However, when the electrolytic capacitor of the comparative example is exposed to a high-temperature environment and sealing member 7 degrades, the stress load of sealing member 7 decreases and this is likely to cause the leakage. In the electrolytic capacitor of the comparative example, the stress load varies depending on the positions where holes 10 in sealing member 7 make contact with lead terminals 8 and 9 as shown in FIG. 3 and Table 1. This causes the leakage of the electrolytic solution from a position where the stress load is locally weak.

In contrast, in the electrolytic capacitor of the exemplary example, holes 20A and 20B are shaped with the above configuration, and thus in each of holes 20A and 20B in the sectional view perpendicular to the axial direction of sealing member 17, the inner side is smaller than the outer side. This shape can increase deformation of sealing member 17 on the inner side, thus increasing the contact surface pressure to lead terminals 18 and 19. This can reduce variations in the stress load depending on the positions where lead terminals make contact with the inside walls of holes 20A and 20B, thus eliminating a portion where the stress load is locally weak. As a result, in the case of the electrolytic capacitor of the exemplary example, even if the capacitor is exposed to a high-temperature environment, sealing member 17 degrades, and the stress load of sealing member 17 decreases, the leakage can be prevented.

The capacitor of this exemplary embodiment has an advantage such that enhanced sealability of the sealing member can suppress the leakage and dry-up of the electrolytic solution. The capacitor of this exemplary embodiment is useful particularly as a capacitor in the field where the use thereof in a high-temperature environment is demanded.

What is claimed is:

1. A sealing member for a capacitor comprising:
   an elastic material having a circular cylindrical shape extending along an axial direction, and a sectional view thereof perpendicular to the axial direction showing a circular shape,
   wherein a pair of through-holes is formed in the sealing member parallel to the axial direction, and
   a shape of each of the pair of through-holes in the sectional view perpendicular to the axial direction is composed of a first arc and a second arc, the first arc protruding toward a circumference of the circular shape, the second arc protruding toward a center of the circular shape and having a curvature smaller than that of the first arc.

* * * * *